United States Patent [19]
Aiti

[11] 3,766,900
[45] Oct. 23, 1973

[54] COMBUSTION CHAMBER FOR INTERVAL COMBUSTION ENGINES

[76] Inventor: Guglielmo Aiti, Vialle Fratelli Spazzoli No. 33, Forli, Italy

[22] Filed: June 5, 1972

[21] Appl. No.: 259,389

[30] Foreign Application Priority Data
June 22, 1971 Italy.................................. 7252 A/71

[52] U.S. Cl...... 1231191 M, 123/193 H, 123/193 P
[51] Int. Cl........................ F02b 23/00, F02b 23/08
[58] Field of Search .................. 123/191 R, 191 M, 123/191 S, 191 SP, 193 R, 193 p, 193 H, 32 A, 32 SA, 32 SP

[56] References Cited
UNITED STATES PATENTS
| | | | |
|---|---|---|---|
| 2,514,730 | 7/1950 | Sonderegger............... | 123/191 M X |
| 2,121,813 | 6/1938 | Mitchell.................. | 123/191 M UX |
| 2,688,320 | 9/1954 | Czarnocki...................... | 123/191 M |
| 2,735,416 | 2/1956 | Ferguson et al................ | 123/191 M |
| 2,736,306 | 10/1956 | McDuffie.....................  | 123/191 M |
| 2,810,377 | 11/1957 | Weissenbach.................. | 123/191 M |
| 3,294,072 | 12/1966 | Simko et al............. | 123/191 SP UX |

FOREIGN PATENTS OR APPLICATIONS
60,781   3/1948   Netherlands.................... 123/191 M Primary Examiner—A Lawrence Smith
Attorney—Richard P. Alberi

[57] ABSTRACT

Combustion chamber for four-stroke internal combustion engines, a recess being formed in the head thereof and accomodating a baffle causing said recess to take a substantially heart-like configuration. In piston of said combustion chamber a recess is also formed and has a baffle causing said recess to take a similar heart-like configuration. In the engine, the two recesses for the head and cylinder are respectively opposite the cylinder and portions baffles, so that the combustion chamber comprises two distinct chamber portions in juxtaposed relationship and communicating through "8"-shaped passages. Thus, a perfect combustion of the mixture and high engine efficiency is provided.

2 Claims, 4 Drawing Figures

COMBUSTION CHAMBER FOR INTERVAL COMBUSTION ENGINES

The present invention relates to a combustion chamber for internal combustion engines, particularly for the four-stroke type of internal combustion engines.

As well known, there is the tendency in internal combustion engines to increase combustion efficiency, to reduce fuel consumptions, and to provide an increment in power obtainable in said engines.

In order to attain these objects, the most various configurations have been given to the combustion chambers for internal combustion engines, as generally provided by shaping the piston crown and the opposing surface of the head defining the combustion chambers.

For example, the French Pat. No. 1,382,110, U.S. Pat. No. 2,514,730 and German Pat. No. 1,061,124 disclosed combustion chambers wherein a recess was formed in the piston crown, this recess facing a corresponding recess in the head of the combustion chamber.

In the German Pat. No. 1,232,783 a combustion chamber was disclosed, in the head of which a recess was formed, a projection of the piston extending thereto; in the British Pat. No. 1,028,608 a combustion chamber was disclosed, in the piston crown of which a deep cavity or seat was formed for containing substantially all of the explosive mixture; in the German Pat. application No. 1,401,965 an engine is shown, wherein the combustion chamber is defined by a piston and a head, of which one has a cavity or seat and the other has a corresponding projection opposite said cavity or seat.

Finally, in the Dutch Pat. No. 60,781 an engine is disclosed, in which the combustion chamber is defined by a step-shaped piston, and a cavity or seat corresponding to the projection portion of the piston is formed in the engine head: in this engine, during the mixture compression stage, two distinct combustion chambers are formed which, following an initial compression stage, are interconnected by passages in the head.

In all of the engines disclosed in the patents mentioned above and in the prior art engines, as well known the efficiencies are very low, this because of many factors, among which a very important factor resides in the impossibility of achieving a perfect combustion for the combustible mixture enclosed within the combustion chamber, this particularly because of the poor swirl building up in the combustion chamber during the explosion of the combustible mixture.

Therefore, an object of the present invention is to provide a combustion chamber in which the piston crown and the opposing surface of the head are so shaped that, as the mixture compressed in the combustion chamber is spark ignited, such gas streams are built up as to cause a very fast and uniform feeding of the flame setting fire to the mixture, so as to exert a high thrust on the piston during the firing stroke and thus to provide an optimum energetic efficiency of the engine.

Another object of the invention is to provide a combustion chamber in which a perfect complete combustion of the combustible mixture is assured, so as to highly minimize the amounts of toxic gases ejected to atmosphere, just as due to faulty combustion.

A still further object of the invention is to provide an engine which, as compared with similar engines, has a lower fuel consumption for a same delivered power.

These and still further objects are accomplished by a combustion chamber for an internal combustion engine, having a piston in the crown of which a recess is formed as defined by a rounded surface, and with a head also having a recess defined by rounded surfaces and in which bores are provided for the valves and sparking plugs, the combustion chamber being characterized in that the maximum depth of the piston crown recess is substantially at the axis of the piston, in said piston crown recess a baffle extends and has its tip also substantially at the axis of the piston, a baffle projects from the head recess and extends between said bores for the valves, both of said baffles are so shaped that said piston and head recesses are both substantially contoured as a stylized heart, in that in the engine comprising the combustion chamber the median planes for the piston and head baffles are coplanar to each other and the tips of said baffles are substantially located on said axis of the piston, and the head recess overlies the piston baffle, while the piston recess overlies the head baffle.

For a better understanding of the structure and features of the combustion chamber, an embodiment thereof will now be described by mere way of not limiting example, reference being had to the accompanying drawings in which.

Figure 3:
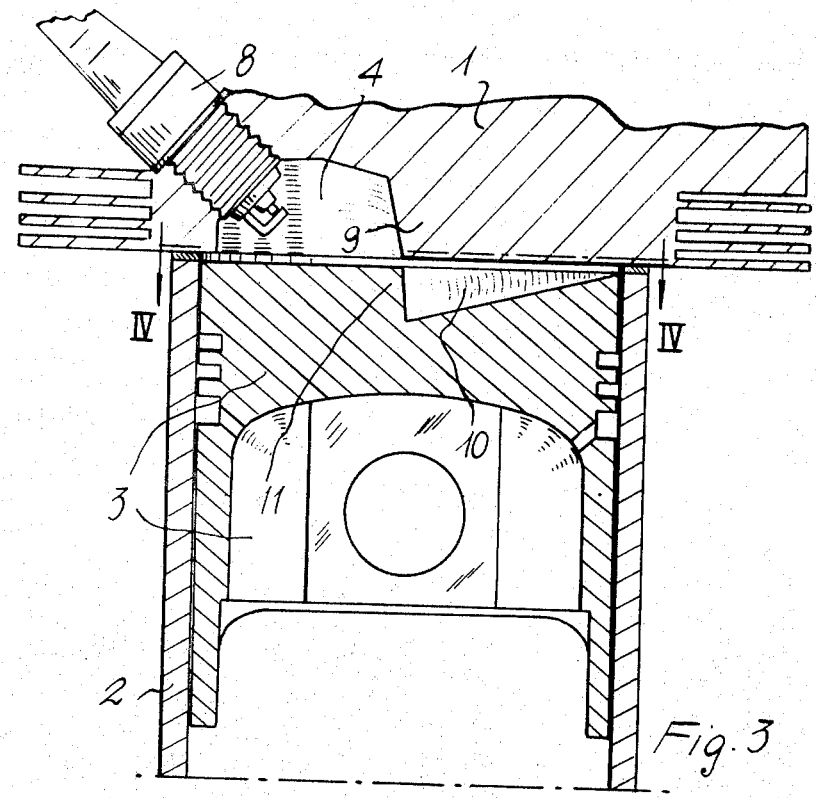
FIG. 3 is a longitudinal sectional view showing an engine comprising the head and piston of FIGS. 1 and 2.

The four-stroke internal combustion engine, as shown in the drawing, comprises a head 1 having a cylinder 2 attached thereto in any known manner and by the interposition of a seal, a piston 3 being accomodated and movable in said cylinder. In FIG. 3, said piston 3 is shown as located at the top dead center, that is at the end of its stroke to said head 1.

Figure 1:
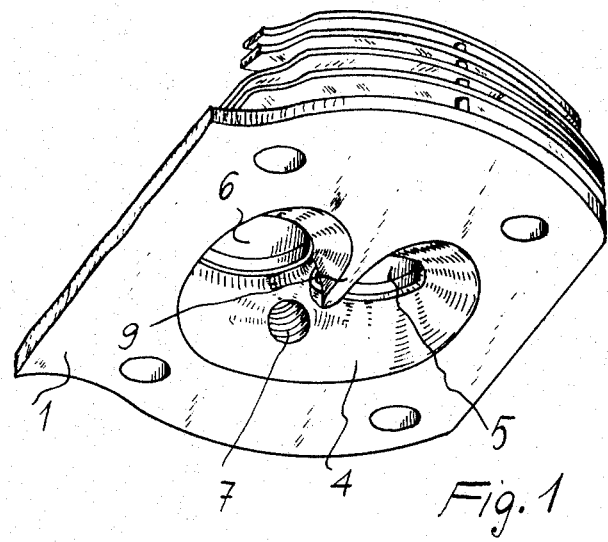
FIG. 1 is a bottom perspective view for the head of an internal combustion engine.
Figure 2:
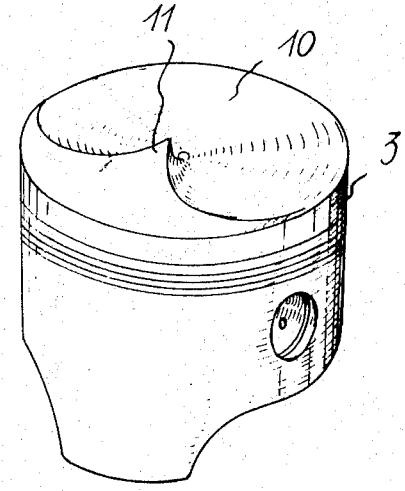
FIG. 2 is a top perspective view of a piston for coupling with the head of FIG. 1.

As particularly shown in FIG. 1, a recess is formed in head 1 and defined by rounded surfaces 4: at this recess bores 5 and 6 are drilled for accomodating the heads of the engine suction and exhaust valves, respectively, and a threaded bore 7 is also formed, engaging therein the thread of a known type of sparking plug 8.

The above described head is characterized in that a baffle 9 projects from the recess defined by the rounded surface 4, extending between said valve bores 5 and 6 and having a plane of symmetry on which the axis of the plug bore 7 lies. As it will be seen both in FIG. 1 and in FIG. 4, said baffle 9 is so shaped that the head recess is substantially contoured as a stylized heart.

Piston 3, which is a part of the engine herein described, has a crown in which a recess is formed and defined by a rounded surface 10, the maximum depth of which being at the axis of the piston. Similarly as stated in connection with the head, the structural feature of the piston is that a baffle 11 extends within the piston crown recess, the tip of this baffle being located also substantially at the axis of said piston. Also in the piston said baffle 11 is so shaped that the recess in the piston crown is substantially contoured as a stilized heart.

Figure 4:
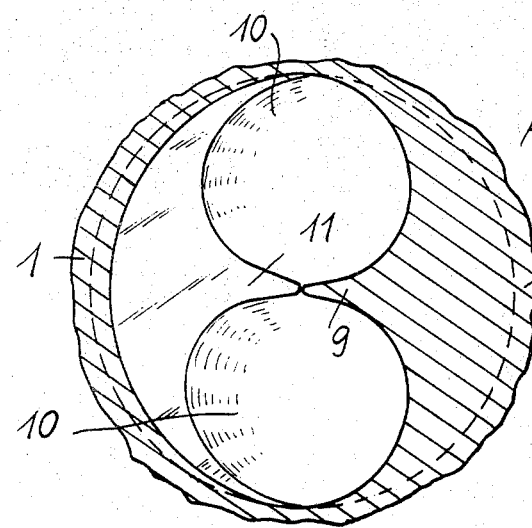
FIG. 4 is a fragmentary cross-sectional view of the engine, as taken along line IV—IV of FIG. 3.

When the piston 3 is assembled to the cylinder 2 fast with the head 1, the median planes of baffles 9 and 11 are coincident with each other and the tips of said baffles substantially lie on the axis of the piston, the recess as defined in the head by surface 4 overlaps the flat surface of the piston baffle 11, and the recess as defined in the piston by surface 10 is opposite to the flat surface of the head baffle 9, as shown in FIGS. 3 and 4.

As a result, when the piston is at its top dead center (FIGS. 3 and 4), the combustion chamber would comprise two distinct chambers which are spaced apart from each other on either side of a plane orthogonal to that of FIG. 3, and containing the axis of the piston. These two distinct chambers are interconnected by two substantially circular passages of an approximate "8" shape, as shown in FIG. 4.

The result of the above described structure is that, when said sparking plug 8 causes the ignition of the combustible mixture within the chamber defined by the flat piston surface corresponding to baffle 11 and by the rounded surface 4 of the head recess, the flame will propagate in all of the combustible mixture volume, in which a high turbolent gas stream is built up, entering, by lapping the surfaces of baffles 9 and 11, the chamber as defined by the rounded surface 10 of the piston recess and the opposing flat surface of the head and baffle 9.

From a great deal of tests, as carried out both in laboratory and on-road with motor-vehicles, the combustion chambers of which were shaped as above described, it was found that the combustion of the explosive mixture within the combustion chamber is substantially quite perfect, with a resulting reduction to negligible rates in toxic gases, particularly CO, with a reduced consumption under the same power and increased power under the same consumption of fuel.

It has also been found that the provision of said two baffles, shaped and located as herein described, is essentially required for achieving the high efficiency as actually confirmed, and which might as well be due to the substantially uniform thrust or pressure being exerted throughout the free surface of the piston, because of the two recesses not overlapping each other, except at a limited portion of the surface thereof.

What I claim is:

1. A combustion chamber for internal combustion engines having a piston, in the crown of which a recess is formed as defined by a rounded surface, and a head also having a recess defined by rounded surfaces and in which bores are provided for the valves and sparking plugs, the combustion chamber being characterized in that the maximum depth of the piston crown recess is substantially at the axis of the piston, in said piston crown recess a baffle extends and has its tip also substantially at the axis of the piston, in that a baffle projects from the head recess and extends between said valve bores, and both of said baffles are so shaped that said piston and head recesses are both substantially contoured as a stylized heart, in that in the engine comprising the combustion chamber the median planes for the piston and head baffles are coplanar to each other and the tips of said baffles substantially lie on said axis of the piston, and the head recess overlaps the piston baffle, while the piston recess overlaps the head baffle.

2. A combustion chamber as claimed in claim 1, wherein the sparking plug bore is drilled at the median plane of that baffle extending in the head recess.

* * * * *